United States Patent
Goldmann et al.

(10) Patent No.: US 7,389,880 B2
(45) Date of Patent: Jun. 24, 2008

(54) UNIT AND METHOD FOR PROCESSING OF SHREDDER RESIDUES AND USES OF A SAND FRACTION PRODUCED THUS

(75) Inventors: Daniel Goldmann, Goslar (DE); Bram den Dunnen, Wolfsburg (DE); Michael Knust, Isenbuettel (DE)

(73) Assignee: Volkswagen AG, Wolfsburg (DE)

(*) Notice: Subject to any disclaimer, the term of this patent is extended or adjusted under 35 U.S.C. 154(b) by 0 days.

(21) Appl. No.: 10/415,505

(22) PCT Filed: Sep. 18, 2001

(86) PCT No.: PCT/EP01/10762

§ 371 (c)(1),
(2), (4) Date: Nov. 17, 2003

(87) PCT Pub. No.: WO02/34402

PCT Pub. Date: May 2, 2002

(65) Prior Publication Data
US 2004/0251173 A1    Dec. 16, 2004

(30) Foreign Application Priority Data
Oct. 27, 2000  (DE) .................. 100 53 492

(51) Int. Cl.
*B03C 1/00* (2006.01)
(52) U.S. Cl. .................. 209/12.1; 209/39; 209/40
(58) Field of Classification Search .............. 209/12.1, 209/20, 39, 40, 214, 216, 930; 241/19, 24.14, 241/79.1
See application file for complete search history.

(56) References Cited

U.S. PATENT DOCUMENTS

| | | | |
|---|---|---|---|
| 4,036,441 A * | 7/1977 | Basten et al. ............ | 241/20 |
| 5,080,291 A * | 1/1992 | Bloom ..................... | 241/19 |
| 5,443,157 A * | 8/1995 | Baker et al. .............. | 209/12.1 |
| 5,535,891 A * | 7/1996 | Kuniyone et al. ........ | 209/12.1 |
| 6,070,733 A | 6/2000 | Osing | |
| 6,203,595 B1 | 3/2001 | Edlinger | |
| 6,578,783 B2 * | 6/2003 | Simon et al. ............. | 241/24.14 |
| 6,666,335 B1 * | 12/2003 | Bradley et al. ........... | 209/3 |

FOREIGN PATENT DOCUMENTS

| | | |
|---|---|---|
| DE | 42 05 309 | 8/1993 |
| DE | 44 37 852 | 5/1996 |
| DE | 197 03 577 | 6/1998 |
| DE | 197 31 874 | 2/1999 |
| DE | 197 42 214 | 4/1999 |

(Continued)

OTHER PUBLICATIONS

Karl-Ulrich Rudolph et al., "Stand der Behandlung und Verwertung von Shredderrueckstaenden aus Altautos," Muell und Abfall, Dec. 1997, pp. 745 to 755.

*Primary Examiner*—Joseph C Rodriguez
(74) *Attorney, Agent, or Firm*—Kenyon & Kenyon LLP

(57) ABSTRACT

A method and system are for sorting shredder residues of metal-containing wastes, in particular of body shells Shredder residues are separated into a shredder light fraction and a non-ferromagnetic fraction (shredder heavy fraction). During the sorting of the shredder light fraction and the shredder heavy fraction in preliminary processes and a main process, a crude-sand fraction is produced by separating out at least a ferromagnetic fraction, a fraction containing nonferrous metals, a fiber fraction, and a granulate fraction. In a refining process, the crude-sand fraction is separated into a residual fraction rich in organics, a dust fraction containing heavy metals, a sand fraction depleted in organics and metals, and a metallic fraction, using the sequential process steps of density separation and metal separation.

32 Claims, 2 Drawing Sheets

FOREIGN PATENT DOCUMENTS

| | | |
|---|---|---|
| DE | 1 99 11 010 | 6/1999 |
| DE | 197 55 629 | 6/1999 |
| EP | 0 863 114 | 9/1998 |
| EP | 0 884 107 | 12/1998 |
| EP | 0 922 749 | 6/1999 |
| EP | 979 677 | 2/2000 |
| WO | WO 98/01276 | 1/1998 |
| WO | WO 00/53324 | 9/2000 |

* cited by examiner

UNIT AND METHOD FOR PROCESSING OF SHREDDER RESIDUES AND USES OF A SAND FRACTION PRODUCED THUS

FIELD OF THE INVENTION

The present invention relates to a method for sorting shredder residues of metal-containing wastes, in particular of vehicle bodies, having the features described herein, as well as a system, which has the features described herein and by which the shredder residues may be sorted. In addition, the present invention relates to a use of a sand fraction, which is depleted in organics and metals and was separated according to the method of the present invention.

BACKGROUND INFORMATION

The shredding of scrapped vehicles for breaking down materials has been known for a long time. In carrying out the shredding process, process controls have been established in which the material mixture produced is divided up into different fractions. Thus, a so-called shredder light fraction (SLF) is initially separated from the material mixture produced, using a suitable suction device. The remaining fraction is subsequently separated into a ferromagnetic fraction (shredder scrap (SS)) and a non-ferromagnetic fraction (shredder heavy fraction (SHF)), using a permanent-magnet separator. The fraction of the metallurgically fully usable shredder scrap-metal fraction is often approximately 50 to 75 wt. %. Existing designs generally provide for the shredder light fraction being disposed of as waste or burned in waste incinerators. It is characterized by both a large fraction of organics and a large fraction of fine-grained material. The heavy fraction, which is not able to fly and is not ferromagnetic, i.e., the shredder heavy fraction, is distinguished by a large percentage of nonferrous (NF) metals. Special sorting systems have been developed for recovering the various NF metals, where, however, the remaining residue of organic and inorganic, non-metallic components is generally disposed of as waste. In the following, shredder residues should be understood as all material streams from the shredding process, which cannot be directly removed at the shredder as products that are metallurgically directly utilizable (shredder scrap).

Described in German Published Patent Application No. 44 37 852 is a method, in which the shredder light fraction is sorted, in particular to remove "unwanted components", especially copper and glass. In this context, the shredder residues are homogenized and mixed in a compulsory mixer with a fine-grained to superfine-grained material containing a magnetizable component, and the resulting mixture is conveyed through a magnetic separator. In this context, it has been shown that the metallic components of the shredder light fraction, which impede metallurgical use, may be separated out in this manner.

European Published Patent Application No. 0 863 114 provides for the production of a permanently plastic, backfilling material for mines, by adding an adhesive component, a filler, and a salt solution to the shredder light fraction. This is intended to provide a pressure-resistant, permanently plastic body.

It is described in German Published Patent Application No. 197 42 214 that the shredder light fraction is shredded further and subjected to a thermal treatment. In this context, metallic components should be sorted out during or after shredding, and the remaining mixture of materials should be melted in a smelting reactor and converted to a "harmless" solid by cooling it.

In addition, European Published Patent Application No. 0 922 749 describes a method for processing the shredder light fraction, where the shredder light fraction is calcined in a fluidized-bed gasifier amid the introduction of or in the presence of calcium carbonate.

In a further, thermal process, German Published Patent Application No. 197 31 874 provides for the shredder light fraction being compressed again in a further step, and then shredded, homogenized, and reduced in water content, in order to be thermally utilized in a subsequent step.

European Published Patent Application No. 0 884 107 provides for the shredder light fraction being converted into a metal-free fraction having a shredding or grinding size of <20 mm, by shredding, classifying, and sorting it. The sorting of the shredder light fraction should result in a thermally utilizable fraction.

In addition to the utilization methods shown, it is conventional that the shredder light fraction can be subjected to a pretreatment, in which residual ferromagnetic fractions of iron, stainless steel, and aluminum are separated. Similar methods have also been used for sorting the shredder heavy fraction. Furthermore, it is conventional that polyolefins can be separated from this fraction.

What the shown methods have in common is, that they are each only designed for processing the shredder light fraction or the shredder heavy fraction. Not provided is common processing with the object of separating the shredder residues as much as possible into at least partially utilizable end products, in particular into a sand fraction which is utilizable as a raw material or can be landfilled in accordance with the current requirements from the German Technical Instructions on Waste from Human Settlements taking effect in a new form as of the year 2005. Against the background of increasing legal requirements (EU End of Life Vehicles Directive, EU Directive on Incineration of Waste, and others), as well as increasing landfill costs and requirements for the material to be landfilled (Technical Instructions on Waste from Human Settlements), an increased utilization rate and an optional pretreatment prior to storage in a landfill is, however, desirable. Thus, the German regulation on end of life vehicles of Apr. 1, 1998 provides for over 95 wt. % of a scrapped car having to be utilized as of the year 2015. In addition, increased requirements from the EU Scrapped Car Guideline passed in September, 2000 specify that the fraction of material streams utilizable as materials and raw materials for mechanical and feedstock recycling should be increased to at least 85 wt. %. Therefore, utilization excludes the mere use as energy, e.g., in waste-incineration plants, in which a disposable, inert fraction would be produced as a secondary effect. The emphasis of the Technical Instructions on Waste from Human Settlements to be observed as of the year 2005 is the requirement for decreasing the organic fraction and the elution potential of heavy metals of the fractions to be landfilled. To be able to use the produced sand fraction as a raw material, e.g., as a loading material or an aggregate in cement plants or sintering plants of blast-furnace factories, or in an aggregate for the manufacture of backing brick in brickkilns, it may be ensured, in particular, that disruptive heavy metals and organic components were removed to the greatest possible extent.

Therefore, an object of the present invention is to provide a method and the system necessary for it, by which shredder residues may be processed, and by which, in addition to further end products, a high-quality sand fraction usable as a raw material or at least disposable in a landfill for human-settlement waste in accordance with future standards, may be produced in a mechanical sorting process.

SUMMARY

According to an example embodiment of the present invention, this object may be achieved by providing a method for sorting shredder residues of metal-containing wastes, in particular of vehicle bodies, having the features described herein, by providing a system for sorting shredder residues having the features described herein, and by the use of a sand fraction, which is produced according to the method of the present invention and has the features described herein.

The method may provide that:

(a) during the sorting of the shredder light fraction and the shredder heavy fraction in preliminary processes and a main process, a crude sand fraction is produced by separating out at least a ferromagnetic fraction, a fraction containing nonferrous metals, a fiber fraction, and a granulate fraction; and (b) in a refining process, the crude-sand fraction is separated into a residual fraction rich in organics, a dust fraction containing heavy metals, a sand fraction depleted in organics and metals, and a metallic fraction, by the successive process steps of density separation and metal separation.

The prepared end products may either be utilized directly or, if desired, subsequently processed in further refining steps to form utilizable, high-quality products. In particular, the sand fraction may be utilized as an aggregate for use in blast-furnace operations, cement plants, or brickkilns. The sand fraction to be provided for such an application may have at least the following characteristics:

a loss on ignition of <30 wt. %
a total organic carbon fraction of <18 wt. %
a Cl content of <1.5 wt. %
a Zn content of <1.0 wt. %
a Cu content of <0.2 wt. %
a Pb content of <0.1 wt. %

It may only be possible to render sand fractions from shredder residues available for utilization as a raw material in an economically practical manner, and on a large scale, by removing disruptive metal particles and organic components to a great extent. A sand fraction stripped in such a manner may satisfy the requirements for a material to be stored in a landfill for human-settlement waste in accordance with the Technical Instructions on Waste from Human Settlements in force as of 2005.

Consequently, at least a high-quality sand fraction, a ferromagnetic fraction, a fraction containing nonferrous metals, a fiber fraction, and a granulate fraction are produced as end products.

Fe, stainless steel, and Al portions broken down in a preliminary treatment may be separated from the shredder light fraction. This shredder light fraction may be:

broken down in a first shredding unit, and
subsequently separated into at least a ferromagnetic fraction and a non-ferromagnetic fraction, using at least one magnetic separator;
the non-ferromagnetic fraction is broken down in a second shredding unit,
a fine-grained sand fraction is separated from this fraction, using at least one classifier, and
the remaining fraction is separated into a fiber fraction and a course-grained, heavy-material fraction in at least one density-separation device.

The procedure shown, which includes the step-by-step breakdown of the shredder light fraction and the interposed method steps for separating out the particularly abrasive ferromagnetic components, may allow the operating costs to be kept low, in particular in the case of the second shredding unit. A further, example embodiment provides for a cellular-plastic fraction essentially made up of polyurethane being additionally separated out in the preliminary process, using a suction device.

In the preliminary process, the shredder heavy fraction is also separated into at least an enriched fraction containing nonferrous metals, a heavy-material fraction, and a fine-grained sand fraction, e.g., using at least one metal separator and at least one classifier. In addition, it is possible for a high-density, residual fraction to be separated from the heavy-material fraction in at least one density-separation device. The shredder heavy fraction is separated into various material streams from the standpoint of possible, joint processing with the material streams previously produced in the preliminary process for processing the shredder light fraction.

In the main process, the material streams from the preliminary processes may be brought together in such a manner, that the sand fractions are combined into a common, crude-sand fraction, and the heavy-material fractions are combined into a common heavy-material fraction, broken down by a shredding unit, and separated by a density-separation device into the granulate fraction and an enriched fraction containing nonferrous metals.

Therefore, the desired end products and intermediate products of granulate, crude-sand, and the fraction containing nonferrous metals are produced in this partial process step. The fractions containing nonferrous metals may then be subjected to a treatment for separating out light-metal fractions, heavier nonferrous-metal fractions, and other metal fractions, e.g., in a common sorting step, using suitable process steps such as sand flotation and optical sorting. The nonmetallic, residual fractions produced during the separation may be resupplied to the main process and/or the preliminary processes at suitable points, as a function of amount and composition.

Among other things, the crude-sand fraction supplied by the above-mentioned sorting processes is already a homogeneous product, i.e., components able to fly, metals, granulate, and fiber have already been separated out to a large extent. However, the crude-sand fraction may only be freed of metal particles and organic components still present by refining it. In this context, density separation may be carried out in a density-separation device. Metal separation is carried out after the density separation. In addition, an undersize fraction, in which dusts containing heavy metals are concentrated, may be separated out.

Further, example embodiments of the method of the present invention are described below.

Example embodiments of the system according to the present invention are described below. Regarding the aspects of the system according to the present invention, reference is made, in particular, to the above-mentioned explanations relating to the method of the present invention.

The present invention is explained below in detail in an exemplary embodiment, with reference to the corresponding drawings.

DETAILED DESCRIPTION

Figure 1:
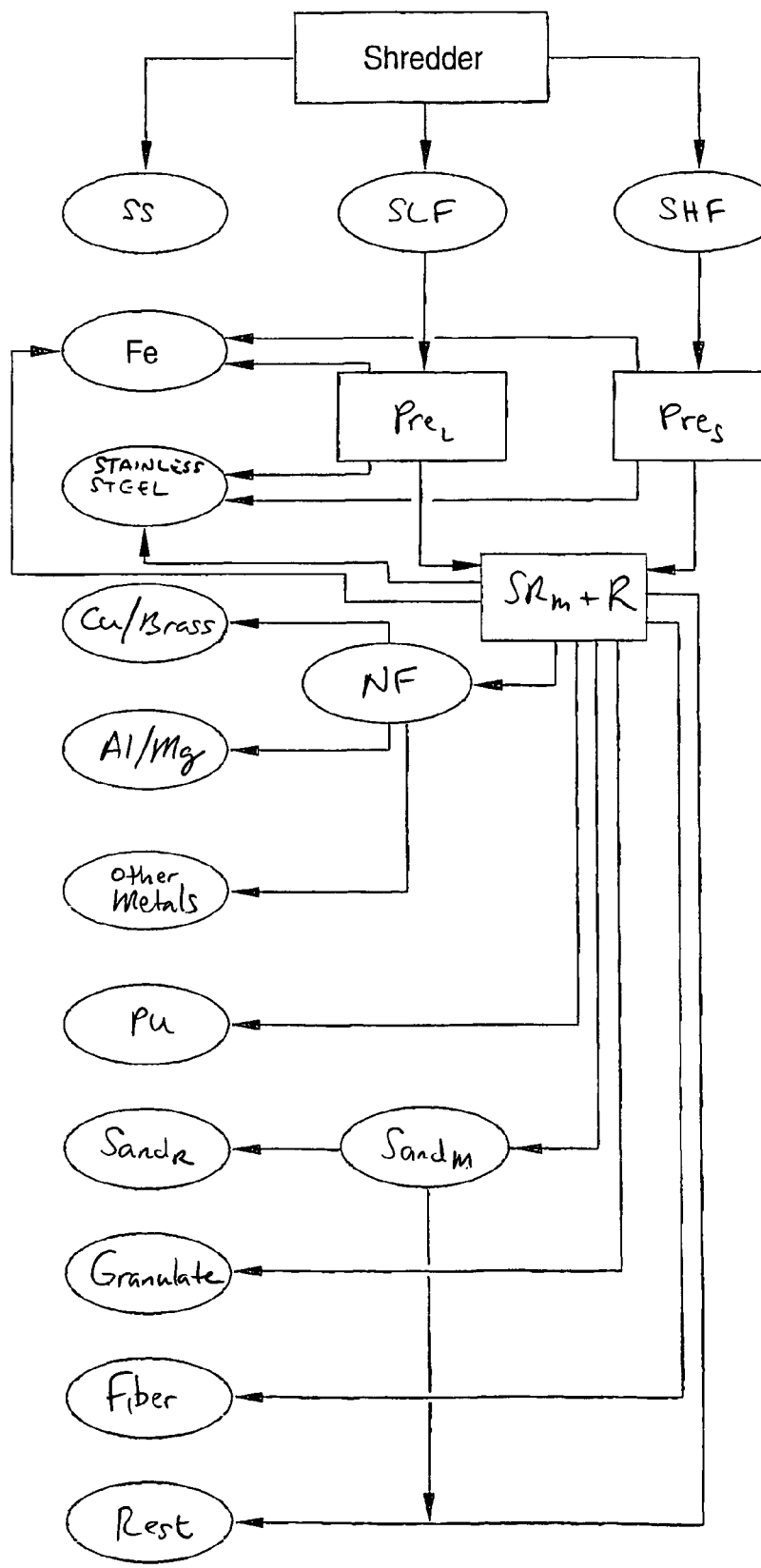
FIG. 1 is a schematic flow diagram giving an overall view of the end products formed at specific times in the process of sorting the shredder residues.

FIG. 1 illustrates a flow chart of the times at which end products are produced according to the method of the present invention, during the sorting of the shredder residues. In an upstream shredding process, metal-containing wastes, e.g., those of vehicle bodies, are initially broken down by a shredder in a shredding process. A light fraction capable of flying is subsequently separated off by a suction device (shredder light fraction SLF). The heavy material stream, which remains after the suction and is not capable of flying, is separated on a permanent-magnet separator, into a ferromagnetic and a non-ferromagnetic fraction. The ferromagnetic fraction is designated as shredder scrap SS and represents the primary shredder product, which may be used directly in metallurgy. The heavy, non-ferromagnetic fraction not capable of flying is referred to as shredder heavy fraction SHF. In a further pretreatment step, ferromagnetic components still present may be separated from shredder light fraction SLF by a magnetic separator. The remaining material stream of shredder light fraction SLF and shredder heavy fraction SHF are now jointly separated as shredder residues into the desired end products.

To this end, the process control provides a preliminary process $Pre_L$ for shredder light fraction SLF, a preliminary process $Pre_S$ for shredder heavy fraction, a joint, main process $SR_M$, and a refining process R for final processing of at least a part of the primary material streams produced in preliminary processes $Pre_L$, $Pre_S$. According to the exemplary embodiment, fractions, which are predominantly made up of highly pure iron Fe, stainless steel, fiber, sand free of organics and metals $Sand_R$, granulate, cellular plastic PU, and a residue to remove, are formed as end products. In addition, a nonferrous-metal fraction NF may be separated out, which, in turn, appropriate process control allows to be divided up into fractions having heavier nonferrous metals Cu/brass, light metals Al/Mg, and other metals. Except for the residual fraction, the end products formed may be utilized metallurgically, as materials, as raw materials, and for energy; or, in the case of the sand fraction, they may at least be stored in an orderly manner in a landfill for human-settlement waste. Refining process R may be developed, in particular, from the point of view of providing a sand fraction depleted in organics and metals $Sand_R$, which may primarily be used as an aggregate in blast-furnace processes, cement plants, or brickkilns, etc., but at least allows storage in a landfill for human-settlement waste in accordance with the Technical Instructions on Waste from Human Settlements as of the year 2005. To this end, sand fraction ($Sand_R$) may have at least the following characteristics:

- a loss on ignition of <30 wt. %
- a total organic carbon fraction of <18 wt. %
- a Cl content of <1.5 wt. %
- a Zn content of <1.0 wt. %
- a Cu content of <0.2 wt. %
- a Pb content of <0.1 wt. %

The process steps described below allow, in particular, the separation of a sand fraction $Sand_R$ from the heterogeneous shredder residues, which meets the above-mentioned specification.

Figure 2:
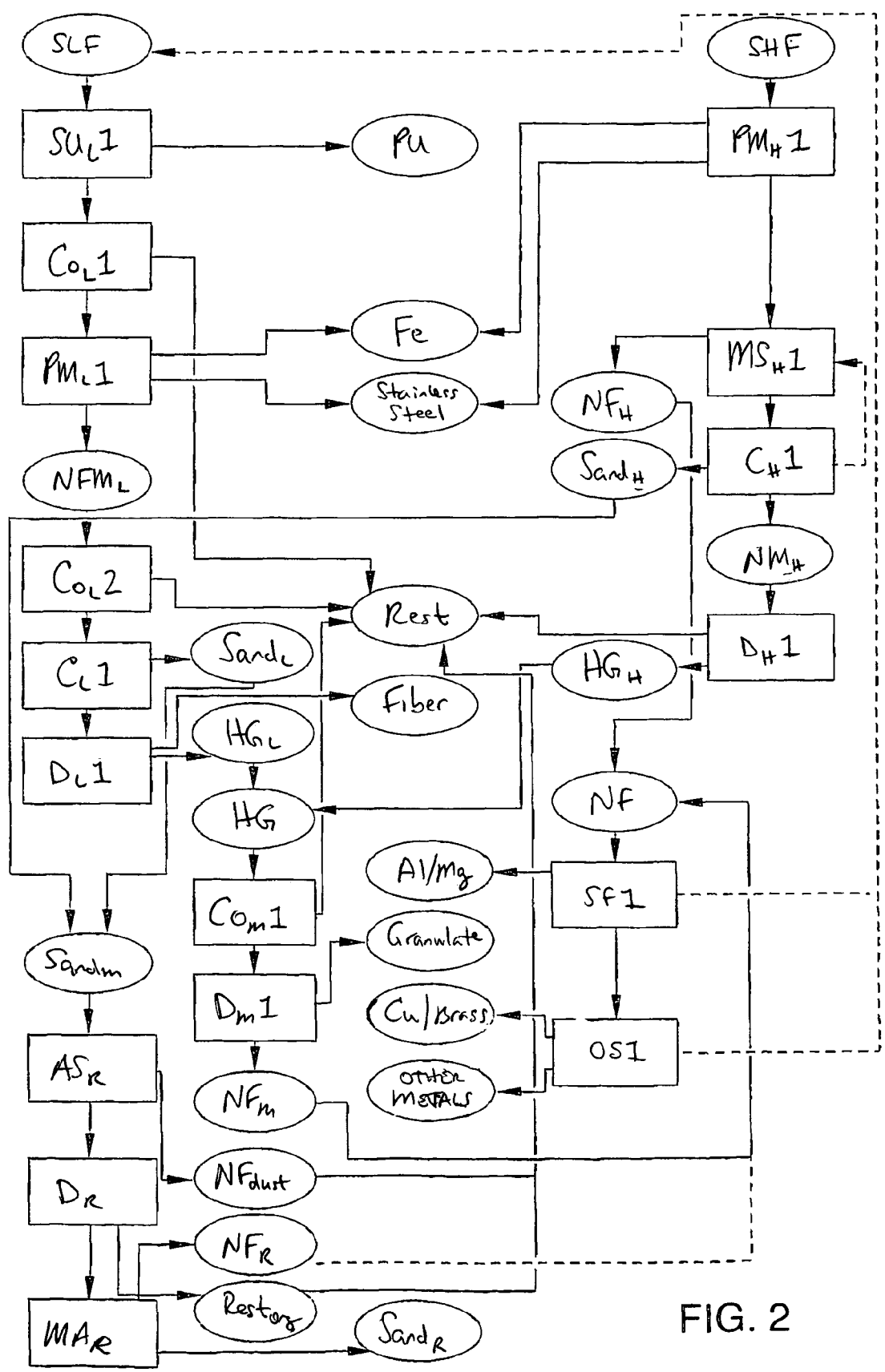
FIG. 2 is a schematic flow diagram for the process control in the preliminary sorting processes and the main sorting process.

FIG. 2 illustrates a schematic flow diagram of components of the system for sorting the shredder residues, as well as the respective intermediate or end products produced at these components during the process control. In order to retain an overall view, the end products produced during the process are arranged in the center. Preliminary process $Pre_L$ for sorting shredder light fraction SLF is schematically represented in the upper left portion, preliminary process $Pre_S$ for sorting shredder heavy fraction SHF is represented in the upper right portion, main process $SR_M$ is displayed in the center of the lower portion, and refining process R is represented in the lower left portion of the drawing.

shredder heavy fraction SHF is initially subjected to two-stage Fe and stainless steel separation by permanent-magnet separator $PM_H1$. After Fe and stainless steel separation, the residual stream is classified, and fractions $NF_H$ containing heavier nonferrous metals are separated out. This may be accomplished, for example, by initial classification into different fractions, e.g., greater than and less than 20 mm, and by separate feeding of each fraction to metal separator $MS_H1$. It is possible to have additional classification steps. In this context, it may be provided to achieve as clean a material separation as possible into fractions $NF_H$ containing heavier nonferrous metals, and remaining fractions $NM_H$ depleted in metals. Classifier $C_H1$ also provides for fractions $NM_H$, which are depleted in metals and which may have a particle diameter <6 mm, being separated out into a sand fraction $Sand_H$.

Remaining coarse-grained fraction $NM_H$ depleted in metals is subsequently separated by a density-separation device $D_H1$ into a heavy-material fraction $HG_H$ and a high-density residual fraction Residue. This may prevent materials, which are still highly abrasive and have sharp edges, such as balls of high-grade steel, from being present in the shredding chamber during the further treatment of heavy-material fraction $HG_H$ in downstream shredding units. In addition, a metal separator may be installed again at this position, in order to separate out the last solid, wear-promoting, metallic contaminants. In summary, preliminary process $Pre_S$ accordingly may yield an iron fraction Fe, a stainless steel fraction, a fraction $NF_H$ containing heavier nonferrous metals, a sand fraction $Sand_H$, and a heavy-material fraction $HG_H$.

In preliminary process $Pre_L$, a cellular-plastic fraction PU, which is predominantly made up of the polyurethane that is highly capable of flying, is initially separated from shredder light fraction SLF in suction device $SU_L1$. The separated pieces of cellular plastic are pneumatically transported into a press container, where they are automatically compressed. This fraction may be directly utilized or optionally undergo a further refining step.

The remaining fraction is broken down in a first shredding unit $Co_L1$, and indeed in such a manner, that a discharge of unit $Co_L1$ contains particles having a diameter, e.g., <50 mm. In order to keep the load on shredding unit $Co_L1$ as small as possible, a classifier may be positioned upstream from it, in order to separate out and supply a fraction having a diameter, e.g., >50 mm. An iron fraction Fe and a stainless steel fraction are separated from the shredded fraction by a permanent-magnet separator $PM_L1$. Remaining non-ferromagnetic fraction $NFM_L$ is now supplied to a second shredding unit $Co_L2$, in which the material is broken down further. In this context, a discharge of shredding unit $Co_L2$ may be, e.g., <10 mm. In this case, the infeed of shredding unit $Co_Ls$ may also be limited to a fraction having a diameter, e.g., >10 mm, using a classifier.

In an additional classifier $C_L1$, a fine-grained sand fraction $Sand_L$ is separated from the now effectively broken-down, non-ferromagnetic fraction $NFM_L$. The particle size of sand fraction $Sand_L$ may be set to, e.g., <4 mm. The remaining fraction is subjected to air sifting and density separation in a suitable device $D_L1$. In device $D_L1$, a light fraction made up of fiber is blown over a heavy-material trap by a cross-current sifter. Due to being previously transported on a vibrating conveyor, the heavier material has already settled to the bottom, so that the underlying heavy fraction automatically falls down into a heavy-material discharge (heavy-material fraction $HG_L$). In summary, the end products and intermediate products of cellular-plastic pieces PU, iron Fe, stainless steel, sand $Sand_L$, and heavy material $HG_L$ may be provided in preliminary process $Pre_L$. The dust and sludges, which contain heavy metals and organic substances and are produced during the processing in shredding units $Co_L1$ and $Co_L2$, are fed to residual fraction Residue.

In main process $SR_M$, sand fractions $Sand_L$ and $Sand_H$ are initially combined into a common, crude-sand fraction $Sand_M$. In order to achieve the above-mentioned specifications for the raw-material utilization as an aggregate material, crude-sand fraction $Sand_M$ may have to be split up further. In this context, it may be provided that refined sand fraction $Sand_R$ contain sufficiently high fractions of oxides of the elements iron, aluminum, silicon, and calcium, which may replace the primary raw materials. In addition, the concentration of potential process or product impurities may be kept as low as possible. Depending on the application, examples of impurities of the type mentioned include the metals copper, zinc, lead, and chromium, but also sodium, potassium, and magnesium. Furthermore, the fraction of organics, e.g., the fraction of halogen-containing plastics, may be sufficiently reduced. Therefore, such a refined sand fraction $Sand_R$ may satisfy the requirements of the Technical Instructions on Waste from Human Settlements already (requirements as of 2005), for a material to be stored in a landfill for human-settlement waste.

A dust fraction $NF_{dust}$ made up of the finest undersize material and organic fractions highly capable of flying is initially separated from crude-sand fraction $Sand_M$ by an air separator $AS_R$. Dust fraction $NF_{dust}$ contains, e.g., heavy-metal dusts and is fed to the residual-material fraction for disposal.

The heavy fraction of air separator $AS_R$ is fed to an air-settling table (density-separation device $D_R$). A light, residual fraction $Residue_{org}$ rich in organics is separated out there. This may be removed from the process directly and combined with residual fraction Residue. The remaining heavy fraction is then freed from residual metallic components, predominantly nonferrous metals (nonferrous-metal fraction $NF_R$), in an all-metal separator $MA_R$. Nonferrous-metal fraction $NF_R$ may be transferred to the nonferrous-metal separation or sorting. In summary, during refining process R, crude-sand fraction $Sand_M$ is therefore separated into a dust fraction $NF_{dust}$, nonferrous-metal fraction $NF_R$, a residual fraction $Residue_{org}$ rich in organics, and a sand fraction $Sand_R$ free of organics and metals.

Heavy-material fractions $HG_L$ and $HG_H$ are also combined into a common heavy-material fraction HG during main process $SR_M$. They are subsequently broken down again in a further shredding unit $Co_M1$. A discharge of shredding unit $Co_M1$ may be designed to be, e.g., <8 mm. Shredding unit $Co_M1$ may take the form of an impeller breaker, in order that the material is optimally broken down at this position. After the shredding, density separation takes place on air-settling tables (density-separation device $D_M1$). The light fraction separated off is predominantly made up of plastic in granular form. If desired, the granulate may be processed further in an additional refining process. Remaining, heavy fraction $NF_M$ is mostly made up of heavier nonferrous metals, mainly copper strands. Therefore, fraction $NF_M$ may already be removed from the process at this point, or it may also be combined with heavier nonferrous-metal fraction $NF_H$ into a common fraction NF, and be jointly sorted.

Fraction NF containing nonferrous metals may be sorted by a sand flotation system SF1 and an optical sorter OS1. Sand flotation allows a light-metal fraction predominantly made up of aluminum Al and magnesium Mg to be separated from a heavy-metal fraction in a dry mechanical manner. It should be noted that the sand used here as a separation medium has nothing to do with the fraction "Sand" separated from the shredder residues. The heavy metals sink into the sand bed, while the light metals float on the sand bed. An upper stream containing light metals and the lower stream enriched with the heavy metals are separated by a separating partition. The metal concentrates are separated again from separating medium Sand in a process step belonging to sand flotation. Separated aluminum and magnesium fraction Al/Mg may optionally be separated to a further extent.

The separated heavy fraction (in particular zinc Zn, copper Cu, brass, lead Pb, and possibly V4A steel) is separated into the nonferrous metals copper/brass and other metals, using optical sorter OS1. Depending on the amount and composition, any nonmetallic residues produced may be fed in at a suitable position, such as, in this case, into preliminary process $Pre_L$. In summary, an Al/Mg fraction, a Cu/brass fraction, a fraction having other metals, a granulate fraction, and a crude-sand fraction $Sand_M$ are provided in the main process $SR_M$ having subsequent nonferrous-metal separation. As previously mentioned, crude-sand fraction $Sand_M$ is further refined or purified in refining process R, so that sand fraction $Sand_R$ free of organics and metals is produced as an end product.

LIST OF REFERENCE SYMBOLS $SU_L1$ suction device (separation of cellular-plastic fraction)
Al/Mg light-metal fraction
Cu/brass heavier nonferrous metal fraction
$D_M1$, $D_L1$, $D_H1$, $D_R$ density-separation devices
Fe iron fraction
Fiber fiber fraction
Granulate granulate fraction
$C_L1$, $C_H1$ classifiers
$MS_H1$, $MA_R$ metal separator/all-metal separator
$N_F$, $NF_M$, $NF_L$, $NF_H$, fractions containing nonferrous metals
$NF_{dust}$, $NF_R$
$NFM_L$ non-ferromagnetic fraction
$NM_H$ fraction depleted in metals
OS1 optical sorter
$PM_L1$, $PM_H1$ permanent-magnet separator
PU cellular-plastic fraction
Residue, $Residue_{org}$ residual (organic) fractions
$Sand_M$ crude-sand fraction
$Sand_L$, $Sand_H$ sand fractions of the preliminary processes
$Sand_R$ sand fraction free of organics and metals
SF1 sand flotation system
HG, $HG_L$, $HG_H$ heavy-material fractions
SLF shredder light fraction
other metals fraction having other metals
$SR_M$ main process
SS shredder scrap
SHF shredder heavy fraction
R refining process for the crude sand
$Pre_L$ preliminary process for the shredder light fraction
$Pre_S$ preliminary process for the shredder heavy fraction
$AS_R$ air separator
$CO_L1$, $Co_L2$, $Co_M1$ shredding units

What is claimed is:

1. A method for sorting shredder residue of metal-containing waste, comprising:
   separating the shredder residue into a shredder light fraction and a shredder heavy fraction;
   producing a crude-sand fraction from the shredder light fraction and the shredder heavy fraction during sorting of the shredder light fraction and the shredder heavy fraction in respective preliminary processes and a main process by extracting at least one ferromagnetic fraction, a fraction containing nonferrous metals, a fiber fraction and a granulate fraction; and
   separating in a refining process the crude-sand fraction into a residual fraction rich in organics, a dust fraction containing heavy metals, a sand fraction depleted in organics and metals and a nonferrous-metal fraction by successive density separation and metal separation.

2. The method according to claim 1, wherein the metal-containing waste includes waste of vehicle bodies.

3. The method according to claim 1, further comprising subjecting the shredder light fraction to a further pretreatment by a magnetic separator to separate out residual, ferromagnetic fractions.

4. The method according to claim 1, wherein one of the preliminary processes includes separating at least a fraction containing nonferrous metals, a fine-grained sand fraction and a high-density residual fraction from the shredder heavy fraction by metal separation, classification and density separation.

5. The method according to claim 4, wherein the classification yields the heavy-material fraction having a diameter of 6 mm.

6. The method according to claim 1, wherein the main process includes:
   breaking down the shredder heavy fractions by a shredding unit; and
   separating the heavy-material fractions by a density-separation device into the granulate fraction and an enriched fraction containing nonferrous metals.

7. The method according to claim 1, further comprising separating metals from the crude-sand fraction.

8. The method according to claim 1, wherein the crude-sand fraction separating step includes separating the dust fraction containing heavy metals prior to the density separation.

9. A method for sorting shredder residue of metal-containing waste, comprising:
   separating the shredder residue into a shredder light fraction and a shredder heavy fraction;
   producing a crude-sand fraction during sorting of the shredder light fraction and the shredder heavy fraction in preliminary processes and a main process by extracting at least one ferromagnetic fraction, a fraction containing nonferrous metals, a fiber fraction and a granulate fraction; and
   separating in a refining process the crude-sand fraction into a residual fraction rich in organics, a dust fraction containing heavy metals, a sand fraction depleted in organics and metals and a nonferrous-metal fraction by successive density separation and metal separation,
   wherein one of the preliminary processes includes separating, using a pretreated, shredder light fraction as a starting point, ferromagnetic fractions, a fine-grained sand fraction and a fiber fraction from a coarse-grained, heavy-material fraction by shredding, metal separation, classification and density separation.

10. The method according to claim 9, wherein the one of the preliminary processes includes separating a cellular-plastic fraction from the pretreated, shredder light fraction by a suction device.

11. The method according to claim 9, wherein the shredding and classification yield the heavy-material fraction having a diameter of 4 to 10 mm.

12. A method for sorting shredder residue of metal-containing waste, comprising:
   separating the shredder residue into a shredder light fraction and a shredder heavy fraction;
   producing a crude-sand fraction during sorting of the shredder light fraction and the shredder heavy fraction in preliminary processes and a main process by extracting at least one ferromagnetic fraction, a fraction containing nonferrous metals, a fiber fraction and a granulate fraction; and
   separating in a refining process the crude-sand fraction into a residual fraction rich in organics, a dust fraction containing heavy metals, a sand fraction depleted in organics and metals and a nonferrous-metal fraction by successive density separation and metal separation;
   wherein the main process includes combining sand fractions into a common, crude-sand fraction, and
   wherein the main process includes:
   breaking down the shredder heavy fractions by a shredding unit; and
   separating the heavy-material fractions by a density-separation device into the granulate fraction and an enriched fraction containing nonferrous metals.

13. A method for sorting shredder residue of metal-containing waste, comprising:
   separating the shredder residue into a shredder light fraction and a shredder heavy fraction;
   producing a crude-sand fraction during sorting of the shredder light fraction and the shredder heavy fraction in preliminary processes and a main process by extracting at least one ferromagnetic fraction, a fraction containing nonferrous metals, a fiber fraction and a granulate fraction;
   separating in a refining process the crude-sand fraction into a residual fraction rich in organics, a dust fraction containing heavy metals, a sand fraction depleted in organics and metals and a nonferrous-metal fraction by successive density separation and metal separation; and
   combining metal fractions to form a common metal fraction,
   wherein the main process includes:
   breaking down the shredder heavy fractions by a shredding unit; and
   separating the heavy-material fractions by a density-separation device into the granulate fraction and an enriched fraction containing nonferrous metals.

14. A method for sorting shredder residue of metal-containing waste, comprising:
   separating the shredder residue into a shredder light fraction and a shredder heavy fraction;
   producing a crude-sand fraction during sorting of the shredder light fraction and the shredder heavy fraction in preliminary processes and a main process by extracting at least one ferromagnetic fraction, a fraction containing nonferrous metals, a fiber fraction and a granulate fraction;
   separating in a refining process the crude-sand fraction into a residual fraction rich in organics, a dust fraction containing heavy metals, a sand fraction depleted in organics and metals and a nonferrous-metal fraction by successive density separation and metal separation; and separating the residual fraction rich in organics from a remaining crude-sand fraction by a density-separation device.

15. A method for sorting shredder residue of metal-containing waste, comprising:

separating the shredder residue into a shredder light fraction and a shredder heavy fraction;

producing a crude-sand fraction during sorting of the shredder light fraction and the shredder heavy fraction in preliminary processes and a main process by extracting at least one ferromagnetic fraction, a fraction containing nonferrous metals, a fiber fraction and a granulate fraction;

separating in a refining process the crude-sand fraction into a residual fraction rich in organics, a dust fraction containing heavy metals, a sand fraction depleted in organics and metals and a nonferrous-metal fraction by successive density separation and metal separation; and integrating the nonferrous-metal fraction produced during separation in the refining process into a sorting process of the nonferrous-metal fraction as a function of amount and composition.

16. A method for sorting crude sand from shredder residues of metal-containing waste, comprising:

separating the shredder residue into a shredder light fraction and a shredder heavy fraction;

producing a crude-sand fraction from the shredder light fraction and the shredder heavy fraction during sorting of the shredder light fraction and the shredder heavy fraction in respective preliminary processes and a main process by extracting at least one ferromagnetic fraction, a fraction containing nonferrous metals, a fiber fraction and a granulate fraction;

separating in a refining process the crude-sand fraction into a residual fraction rich in organics, a dust fraction containing heavy metals, a sand fraction depleted in organics and metals and a nonferrous-metal fraction by the successive density separation and metal separation; and separating a sand fraction depleted in organics and metals as a raw-material as configured as one of an aggregate in cement plants and sintering plants of blast-furnace operations and an aggregate for manufacturing backing brick in brickkilns, the sand fraction configured to satisfy requirements for storage in landfills for human-settlement waste.

17. The method according to claim 16, wherein the metal-containing waste includes waste of vehicle bodies.

18. A method for sorting crude sand from shredder residues of metal-containing waste, comprising:

separating the shredder residue into a shredder light fraction and a shredder heavy fraction;

producing a crude-sand fraction during sorting of the shredder light fraction and the shredder heavy fraction in preliminary processes and a main process by extracting at least one ferromagnetic fraction, a fraction containing nonferrous metals, a fiber fraction and a granulate fraction;

separating in a refining process the crude-sand fraction into a residual fraction rich in organics, a dust fraction containing heavy metals, a sand fraction depleted in organics and metals and a nonferrous-metal fraction by the successive density separation and metal separation; and separating a sand fraction depleted in organics and metals as a raw-material as configured as one of an aggregate in cement plants and sintering plants of blast-furnace operations and an aggregate for manufacturing backing brick in brickkilns, the sand fraction configured to satisfy requirements for storage in landfills for human-settlement waste, wherein the sand fraction includes:

a loss on ignition of <30 wt. %;

a total organic carbon fraction of <18 wt. %;

a Cl content of <1.5 wt. %;

a Zn content of <1.0 wt. %;

a Cu content of <0.2 wt. %; and a Pb content of <0.1 wt. %.

19. A method for sorting shredder residues of metal-containing wastes, comprising:

obtaining a material stream by separating the shredder residues into a shredder light fraction and a shredder heavy fraction in a preliminary process;

producing a crude-sand fraction from the shredder light fraction and the shredder heavy fraction via extraction of at least one ferromagnetic fraction, a fraction including nonferrous metal, a fiber fraction, and a granulate fraction; and separating the crude-sand fraction in a refining process into a residual fraction rich in organics, a dust fraction including heavy metals, a sand fraction lacking in organics and metals, and a nonferrous-metal fraction.

20. The method according to claim 19, further comprising:

sorting the shredder heavy fraction in the preliminary process.

21. The method according to claim 19, further comprising subjecting the shredder light fraction to a further pretreatment by a magnetic separator to separate out residual ferromagnetic fractions.

22. The method according to claim 19, further comprising starting out from the pretreated, shredder light fraction, and separating ferromagnetic fractions, a fine-grained sand fraction, and the fiber fraction from a coarse-grained, heavy-material fraction in the preliminary process, with the aid of shredding, metal separation, classification, and density separation.

23. The method according to claim 22, wherein the shredding and classification yield a heavy-material fraction having a diameter of 4 to 10 mm.

24. The method according to claim 19, further comprising using a suction device to separate in the preliminary process a cellular-plastic fraction from the pretreated, shredder light fraction.

25. The method according to claim 19, further comprising using metal separation, classification, and density separation to separate from a heavy-material fraction in the preliminary process, from the shredder heavy fraction, at least a fraction including nonferrous metals, a fine-grained sand fraction, and a high-density residual fraction.

26. The method according to claim 25, wherein the classification yields a heavy-material fraction having a diameter of greater than 6 mm.

27. The method according to claim 19, further comprising:

using a shredding unit in the process to break down at least one heavy-material fraction; and using a density-separation device to separate the at least one heavy-material fraction into the granulate fraction and into an enriched fraction including nonferrous metals.

28. The method according to claim 19, further comprising:

separating at least a fine-grained sand fraction from a coarse-grained, heavy-material fraction in the preliminary process;

separating from a heavy-material fraction in the preliminary process, from the shredder heavy fraction, at least a fine-grained sand fraction; and combining the sand fractions into the crude-sand fraction.

29. The method according to claim 19, further comprising:

separating from a heavy-material fraction in the preliminary process, from the heavy shredder fraction, at least a fraction containing nonferrous metals;

separating the heavy-material fraction and a coarse-grained, heavy-material fraction into at least an enriched fraction including nonferrous metals; and combining the metal fractions to form a common metal fraction.

30. The method according to claim 19, wherein the dust fraction including heavy metals is separated out prior to separating the shredder residues into the shredder light fraction and the shredder heavy fraction.

31. The method according to claim 19, further comprising integrating into a sorting process of the nonferrous-metal fraction the fraction including nonferrous-metal, produced during the separation in the refining process, as a function of amount and composition.

32. The method according to claim 19, wherein the sand fraction has (i) a loss on ignition of less than 30 wt. %, (ii) a total organic carbon fraction of less than 18 wt. %, (iii) a Cl content of less than 1.5 wt. %, (iv) a Zn content of less than 1.0 wt. %, (v) a Cu content of less than 0.2 wt. %, and (vi) a Pb content of less than 0.1 wt. %.

* * * * *